Dec. 28, 1965   H. BECKER   3,225,634
APPARATUS FOR DIVIDING A FILM OF THERMOPLASTIC
MATERIAL INTO SMALL STRIPS
Filed Sept. 28, 1962

3,225,634
APPARATUS FOR DIVIDING A FILM OF THERMO-
PLASTIC MATERIAL INTO SMALL STRIPS
Hermann Becker, Raesfeld, Kreis Borken,
Westphalia, Germany
Filed Sept. 28, 1962, Ser. No. 227,648
Claims priority, application Germany, Sept. 29, 1961,
B 64,184
4 Claims. (Cl. 83—171)

The invention refers to an apparatus for dividing a film of thermoplastic material into small strips by means of a plurality of knives. The apparatus is particularly suited for dividing films of low pressure polyethylene into strips which then are converted into threads, as for instance described in the U.S. Patent 2,985,503.

It is an object of the invention to divide a thermoplastic film into precise small strips.

According to the invention there is provided guide means for a sheet of thermoplastic material and a plurality of fixed thin knife blades each having a circular edge fixed on a non-rotable shaft at intervals which correspond to the desired width of strips to be cut from the sheet, said shaft and guide means for the thermoplastic film being movable relatively to each other. In a preferred form of the invention the guide means carries an interchangeable layer of a material which is weaker than the material of the knives. It is of particular advantage to heat the knives up to about 50–65° C., for example by heating the shaft of the knives. In using such knives the cutting speed of heated knives is 30–40% higher than the cutting speed of unheated knives.

The drawings show an example of an apparatus made according to the invention.

Figure 1:
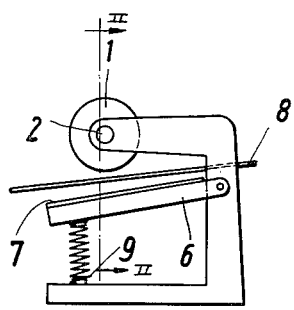
FIG. 1 shows a side elevation of the apparatus.
Figure 2:
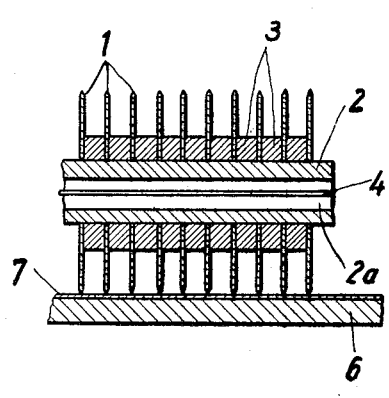
FIG. 2 shows a longitudinal section of the apparatus taken along line II—II of FIG. 1.
Figure 3:
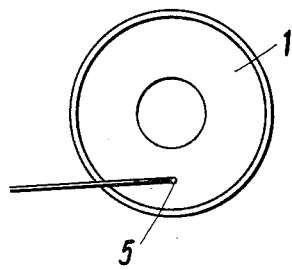
FIG. 3 shows a single knife of the apaparatus.

Each knife comprises a circular steel plate with a diameter of about 70 cm. or 80 cm. with a borehole of about 30–50 cm. diameter. The thickness of the knife is less than 1 mm., preferably about 0.2 mm. The periphery of the knife is sharpened. Knives of this kind are known in machines for cutting rib velvet or the like except that such knives are rotated, whereas the knives of the apparatus according to the invention remain fixed. The cutting edge of the knives may form a part of a circle instead of a complete circle.

A plurality of these knives 1 are threaded on a fixed shaft 2 so that the knives cannot rotate, and a brass ring 3 is provided between adjacent knives to provide for spacing between the knives. The knives 1 and the brass rings 3 may be fixed on the shaft in any way, for instance they may be secured between nuts (not shown) which are screwed onto the shaft.

The shaft 2 is mounted on the frame of the apparatus so that it cannot rotate during the cutting process.

The shaft 2 has a bore 2a within which there is arranged an electrical heating element 4 which may be a heating coil or a heating bar. When energizing the element 4 the knives 1 are heated. The heating temperature of the knife edges is dependent of the material to be cut, and may in some cases be about 50–60° C. The temperature of the knife edges may be measured by a feeler contacting one of the knives. Then the temperature of the knives may be controlled automatically.

The film or foil to be divided may be 0.03 mm. thick. It is led over a table which guidably supports the film and which comprises a steel plate 6 and a thin plate 7 on said steel plate 6. The plate 7 is made of a material which has a smooth surface and is weaker than the material of the knives 1. Thus the knives are able to cut a little into the plate 7.

The plate 7 may be made of a plastic, for instance of Resopal, or of a hard cardboard; its thickness may be on the order of 1–2 mm.

The table 6 is preferably hinged for downward movement for introducing the foil 8. A spring 9 presses the table 6 into the upper position, so that the foil 8 is pressed against the knives 1.

I claim:

1. In apparatus for dividing a film of thermoplastic material into small strips, a plurality of thin knife blades each having a circular knife edge, a fixed shaft, said knife blades being nonrotatably mounted on said fixed shaft, means for heating said knife blades, means for guidably supporting said film including an interchangeable layer of a material weaker than the knife blade edges, said means for guidably supporting said film and said shaft being movable relatively to each other.

2. In apparatus for dividing a film of thermoplastic material into small strips, a plurality of thin knife blades each having a circular knife edge, a fixed shaft, said knife blades being non-rotatably mounted on said fixed shaft, and means for guidably supporting said film, the latter said means and said shaft being movable relatively to each other, said means including a flat plate and a thin layer of material on said plate facing the edges of the knives, said layer being constituted of material which is weaker than the knife blade edges whereby the latter are able to cut into the layer.

3. In apparatus for dividing a film of material into small strips, a plurality of thin knife blades each having a circular knife edge, a fixed shaft, said knife blades being non-rotatably mounted on said fixed shaft, a flat plate adjacent the knife blades for guidably supporting the film, said plate and shaft being relatively movable towards and away from one another, and means urging the flat plate against the edges of the knife blades, said plate and blades being relatively immovable in a direction tangential to the circular knife edges at the location where the knife edges contact the plate.

4. In apparatus as claimed in claim 8 wherein the means urging the flat plate against the edges of the knife blades comprises resilient means engaging the flat plate to resiliently urge the plate against the edges of the knife blades and thereby provide resilient cutting pressure.

References Cited by the Examiner
UNITED STATES PATENTS

| | | | |
|---|---|---|---|
| 567,130 | 9/1896 | Goldstein et al. | 83—431 |
| 1,996,176 | 4/1935 | Smith | 83—509 |
| 1,998,357 | 4/1935 | Carlson | 83—509 |
| 2,251,282 | 8/1941 | Huizeng | 83—171 |
| 2,596,400 | 5/1952 | Hill | 83—171 |
| 2,623,586 | 12/1952 | Volpi | 83—171 |
| 2,736,257 | 2/1956 | Stephenson | 83—171 |
| 2,781,839 | 2/1957 | Bockrath et al. | 83—171 |
| 2,805,700 | 9/1957 | Klasing et al. | |
| 3,069,953 | 12/1962 | Brickle | 83—566 |

FOREIGN PATENTS 88,335   12/1959   Denmark.

WILLIAM W. DYER, Jr., *Primary Examiner.*
HUNTER C. BOURNE, Jr., LEON PEAR, *Examiners.*